United States Patent [19]
Gerber et al.

[11] 4,373,412
[45] Feb. 15, 1983

[54] METHOD AND APPARATUS FOR CUTTING SHEET MATERIAL WITH A CUTTING WHEEL

[75] Inventors: Heinz J. Gerber; David R. Pearl, both of West Hartford, Conn.

[73] Assignee: Gerber Garment Technology, Inc., South Windsor, Conn.

[21] Appl. No.: 168,312

[22] Filed: Jul. 10, 1980

[51] Int. Cl.[3] ........................ D06H 7/00; G06F 15/46
[52] U.S. Cl. ........................................... 83/24; 83/28; 83/56; 83/71; 83/98; 83/451; 83/925 CC
[58] Field of Search .................. 83/925 CC, 508, 451, 83/471.2, 483, 98, 557, 563, 24, 28, 56, 71; 29/418

[56] References Cited

U.S. PATENT DOCUMENTS

| | | | |
|---|---|---|---|
| 2,109,889 | 3/1938 | Morin | 83/508 X |
| 2,378,033 | 6/1945 | Pash | 33/32 C X |
| 2,538,972 | 1/1951 | Magnani | 83/508 X |
| 2,683,489 | 7/1954 | Jackman | 83/508 X |
| 3,470,782 | 10/1969 | Acker | 83/508 X |
| 3,496,817 | 2/1970 | Staats et al. | 83/451 X |
| 3,726,165 | 4/1973 | Hendrickson | 83/451 X |
| 3,772,949 | 11/1973 | Pavone et al. | 83/471.2 X |
| 3,776,072 | 12/1973 | Gerber et al. | 83/835 X |
| 3,872,786 | 3/1975 | Holton | 83/98 X |
| 3,893,881 | 7/1975 | Gerber et al. | 156/250 |

*Primary Examiner*—Frank T. Yost
*Attorney, Agent, or Firm*—McCormick, Paulding & Huber

[57] ABSTRACT

An automatically controlled cutting machine for cutting sheet material employs a cutting wheel and a hard, smooth and continuous surface on which the sheet material is spread for cutting. To prevent shifting during cutting, the material is releasably attached to the support surface by adhesives, freezing, electrostatics and other securing means. The cutting wheel is forced downwardly against the hard support surface by a number of means to insure severing of the sheet material and may be ultrasonically vibrated to facilitate the severing process.

6 Claims, 18 Drawing Figures

FIG. 14
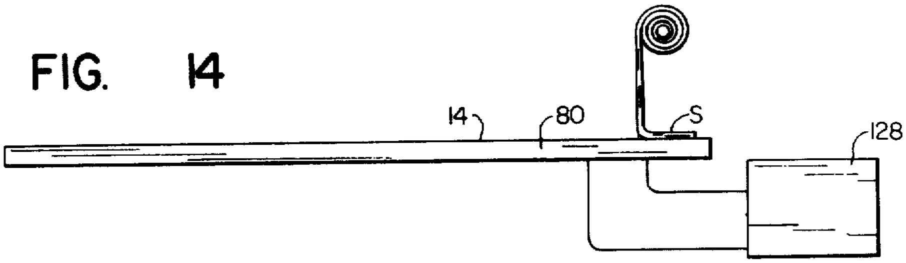
FIG. 15
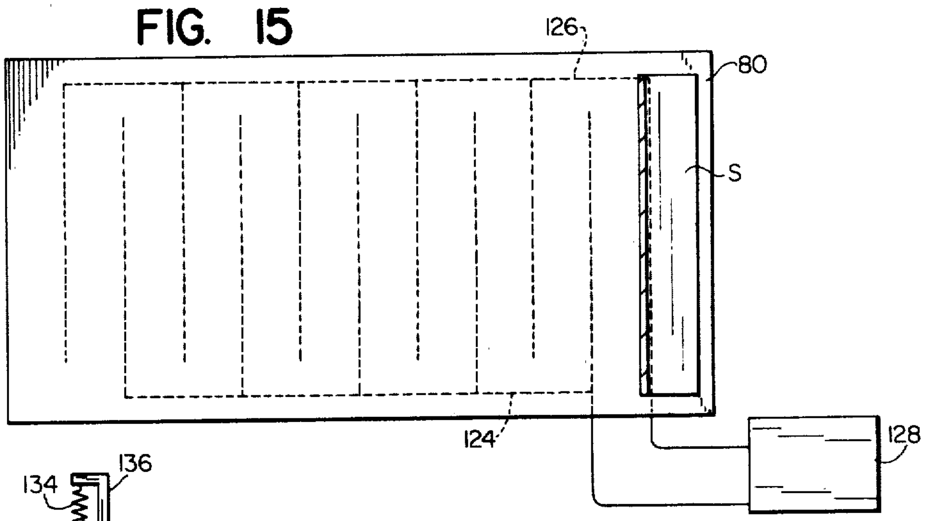
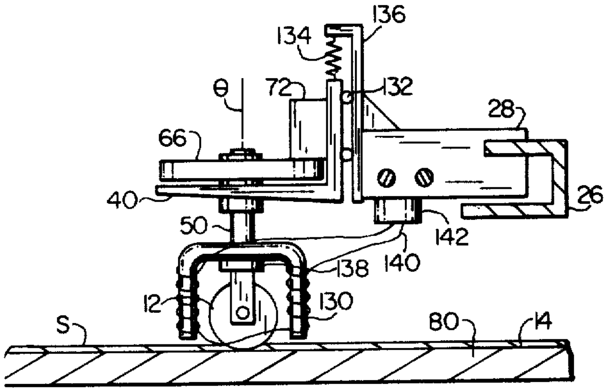
FIG. 16
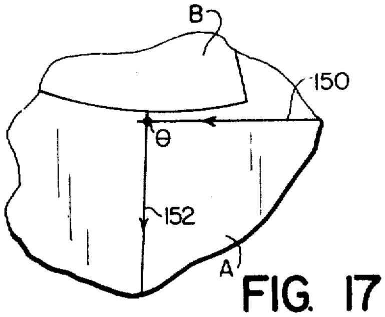
FIG. 17
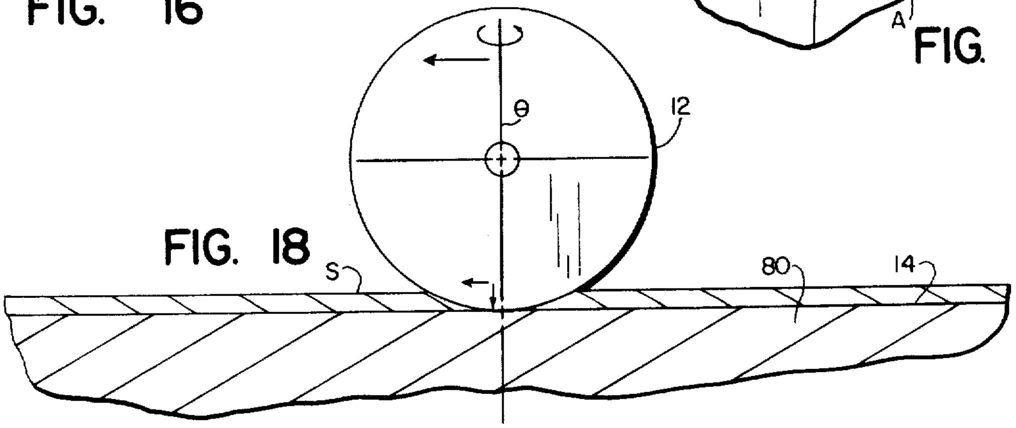
FIG. 18

METHOD AND APPARATUS FOR CUTTING SHEET MATERIAL WITH A CUTTING WHEEL

BACKGROUND OF THE INVENTION

The present invention relates to the field of cutting, and is particularly concerned with cutting sheet material, generally in single plies, with a cutting wheel.

Automatically controlled cutting machines for cutting single or a few plies of sheet material are known in the prior art as illustrated in U.S. Pat. No. 3,522,753 issued to Schmied, U.S. Pat. No. 3,772,949 issued to Pavone et al. and U.S. Pat. No. 3,776,072 issued to Gerber et al. Typical of the types of sheet material cut in the prior art machines are limp sheet material such as woven and nonwoven fabrics, paper, leather, cardboard, foil and filamentary sheets or tapes.

Rotary wheel cutters in contrast to reciprocating blade cutters such as shown in U.S. Pat. No. 3,495,492 to Gerber et al. have unique characteristics which render them suitable for cutting single or relatively few plies of sheet material that collectively are relatively thin, for example, less than ¼ inch (0.6 cm) in thickness. The cutting action produced by a wheel comes about through a severance of the material when the sharp peripheral cutting edge of the wheel is brought into engagement with a hard surface with the material in between. The edge severs the material or fibers in what is believed to be both a crushing and a cutting operation. Continuity of the support surface is therefore important. A unique and advantageous characteristic of the cutting process is that there is basically no inherent limitation on the speed at which the severance of material takes place nor upon the rate at which the cutting wheel operates in producing that severing process. Consequently, a cutting wheel is a desirable tool for cutting a single ply of a selected fabric material, for example, for a man's suit.

One of the principal difficulties that is encountered in cutting single plies of sheet material, however, is the retention of the sheet material in a fixed position throughout the cutting process. It will be understood that with an automatically controlled machine that operates from a predetermined program, the material cannot shift in the course of a cutting operation; otherwise, the pattern pieces that are cut will not conform to the programmed lines of cut. Also, since high speed is one of the main advantages of the cutting wheel, the machine should be designed to perform at high speed with minimum inertia and extra motion.

It is accordingly a general object of the present invention to provide an improved automatically controlled apparatus and process for cutting with a wheel without the difficiencies of the prior art.

SUMMARY OF THE INVENTION

The present invention resides in a method and apparatus for cutting sheet material by means of a cutting wheel which translates relative to a hard surface that supports the sheet material during cutting. The wheel has a sharp peripheral cutting edge pressed into engagement with the support surface with the material in between to sever the material along a desired line of cut.

Means are provided for securing the sheet material is a fixed position to the support surface to prevent shifting of the material relative to the surface as the wheel performs a cutting operation. For example, a releasable adhesive may be provided between the material and the support surface so that after the material is spread, the material is held fixedly in a smooth, flat condition on the surface during cutting and is easily removed from the surface after the desired cutting operation has been completed. In another form of the invention, the material can be frozen to the support surface by means of a settable liquid such as water. Also, the material can be held in place electrostatically.

Means are provided to press the cutting wheel and the support surface together for severing the material. In one embodiment magnetic means generate the pressure without reacting forces through the carriage mechanism that translates the cutting wheel and the sheet material relative to one another. With no reactive load, the carriages may be built with a lighter construction and lower inertia to improve the speed with which the cutting motions are executed. Also, transducing means may be connected with the cutting wheel to generate low amplitude, high frequency vibrations between the sharp cutting edge of the wheel and the support surface which facilitates severance of the material.

In a new method of cutting the overall cutting time for a given cutting operation is reduced by eliminating overcuts and heel cuts typically used with reciprocated cutting blades at angles in a cutting path. When a cutting wheel is advanced only to the apex of the angle, then lifted, rotated and lowered directly over the apex, the segment of the wheel buried in the material actually cuts the material slightly in advance of and behind the apex. Accordingly, overcutting and short heel cuts are not needed and do not delay the cutting process at each angle in a cutting path.

BRIEF DESCRIPTION OF THE DRAWINGS

FIGS. 14 and 15 illustrate an electrostatic means for securing sheet material in position during a cutting operation.

FIG. 16 illustrates magnetic means for generating forces between the cutting wheel and a cutting surface to sever the sheet material.

FIGS. 17 and 18 illustrate a method of cutting angular corners in pattern pieces by means of a cutting wheel.

DESCRIPTION OF THE PREFERRED EMBODIMENTS

Figure 1:
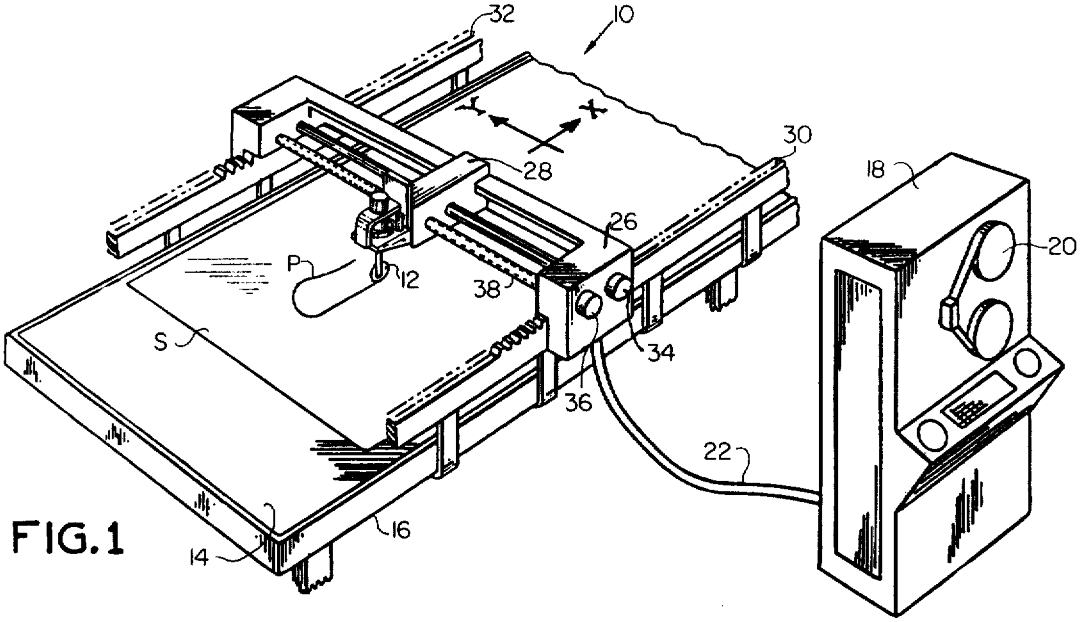
FIG. 1 is a perspective view of a cutting apparatus in which the present invention is employed.

FIG. 1 illustrates an automatically controlled cutting machine, generally designated 10, in which the cutting tool is a cutting wheel 12, preferably not less than one inch (2.54 cm) in diameter, that rolls freely in cutting engagement with sheet material S positioned on a hard, smooth and continuous support surface 14 of a cutting table 16. The machine may be utilized for cutting relatively thin sheet material which is positioned on the support surface 14 in a single ply or a stack of a few plies having a total depth less than one half the radius of the cutting wheel 12, for example, ¼ inch (0.6 cm). The illustrated machine is numerically controlled by means of a controller 18 which guides the cutting wheel along predetermined lines of cut that define, for example, the periphery of pattern pieces forming a man's dress suit. The contours or shapes of the pattern pieces and the associated lines of cut are defined in a program tape 30 which is read by the controller to produce machine command signals that are transmitted to the cutting table through a command signal cable 22.

The cutting wheel 12 is suspended above the support surface 14 of the table 16 by means of an X-carriage 26 and a Y-carriage 28. The X-carriage 26 translates back and forth over the support surface in the illustrated X-coordinate direction on a set of racks 30, 32 which are engaged by an X-drive motor 34 energized by command signal transmitted through the cable 22. The Y-carriage 28 is mounted on the X-carriage 26 for movement relative to the carriage 26 in the Y-coordinate direction, and is translated by the Y-drive motor 36 and a lead screw 38 connected between the motor and the carriage 28. Like the drive motor 34, the drive motor 36 is also energized by command signals received through the cable 22 from the controller 12. Thus, coordinated movements of the carriages 26 and 28 translate the cutting wheel 12 along a cutting path over any area of the table 16.

Figure 5:
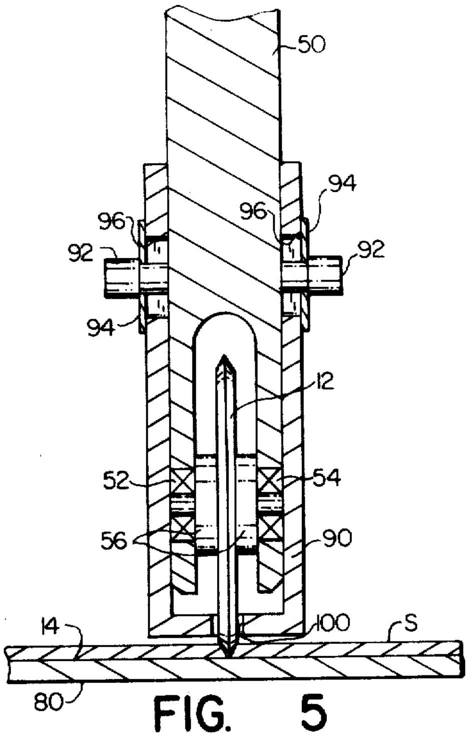
FIG. 5 is a front elevation view of the cutting wheel and stripper.

As shown in greater detail in FIGS. 2 and 3, the cutting wheel 12 is suspended below a platform 40 attached to the projecting end of the Y-carriage 28. The suspension includes a pneumatically or hydraulically operated actuator 42 fixedly supported above the platform 40 by means of a frame 46. The actuator includes a piston and rod assembly 44 which is connected to the wheel 12 through a swivel connection 48 and a square drive rod 50. As shown in FIG. 5, the lower end of the drive rod 50 is bifurcated, and the cutting wheel is mounted by means of bearings 52 and 54 within the bifurcation for free rotation relative to the drive rod and the sheet material S on the cutting table. Spacers 56 at each side of the wheel 12 hold the wheel in a centered position within the bifurcation of the drive rod 50 and insure accurate tracking of the wheel along a predetermined line of cut.

The cylinder 42 is utilized to lower the cutting wheel 12 into cutting engagement with sheet material on the table 14 as well as to establish a downward force which presses the sharp cutting edge of the wheel against the support surface 14 and severs the sheet material during the course of a cutting operation. Pneumatic or hydraulic pressure is delivered to the cylinder through a supply line 58 and operates on the upper surface of the piston 44 to lower the piston as well as the cutting wheel and produce the downward force. A coil spring 60 is disposed around the upper end of the piston rod 62 and urges the cutting wheel 12 and the piston rod upwardly to the phantom position when the pressure within the cylinder 42 is relieved. Thus, by controlling pressure within the cylinder, the cutting wheel can be brought into and out of engagement with sheet material on the cutting table, and in the event of a power failure, the coil spring 60 raises the wheel in a failsafe mode of operation.

In order to execute cutting along a path P as shown in FIG. 1, the cutting wheel 12 must not only be translated over the table by the carriages 26 and 28, but also must be oriented in the direction of travel. Accordingly, the square drive rod 50 is slidably engaged with a toothed pulley 66 coupled by means of another toothed pulley 68 and a drive belt 70 to a θ-drive motor 72 to orient the cutting wheel 12 in response to command signals derived from the control computer 18. The swivel connection 48 allows the drive rod to be rotated independently of the piston 44, but lifts and lowers the rod through the pulley 66.

Figure 2:
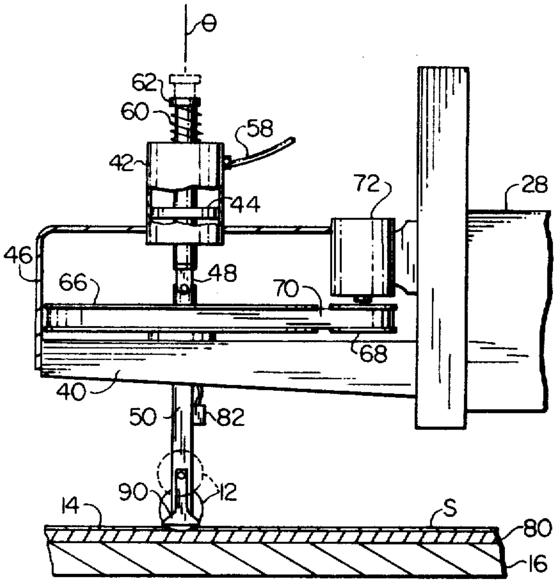
FIG. 2 is a side elevation view of the cutting wheel and carriage in the cutting machine.
Figure 3:
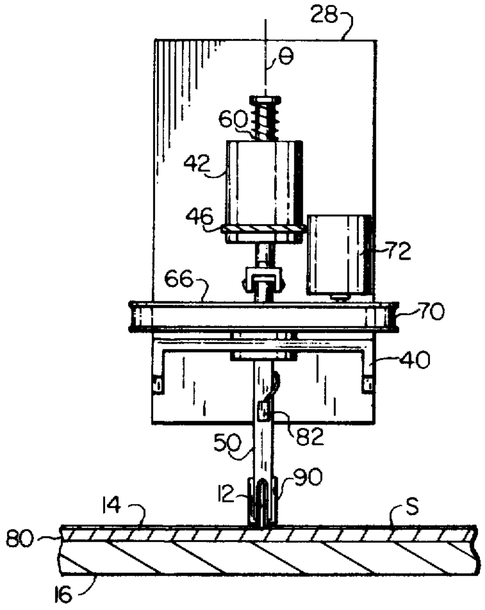
FIG. 3 is a front elevation view of the cutting wheel and carriage.

As shown in FIGS. 2 and 3, the support surface 14 of the cutting table 16 (FIG. 1) is defined by the upper surface of a hard plate 80 which in one embodiment is made from sheet steel. Other types of materials which are suitable for the plate include aluminum and other metals, fiberboard, a hard plastic or other synthetic materials. Due to the downward forces applied by the piston and cylinder assembly 42, the sharp peripheral cutting edge of the wheel 12 slightly scores the surface of the sheet metal as the wheel is translated in cutting engagement with sheet material S on the surface. The downward force is selected to allow a limited scoring of the material for complete severance of the material along the cutting path, but the force is sufficiently limited so that the depth of any scoring does not interfere with subsequent cutting and does not rapidly dull the peripheral cutting edge of the wheel 12. To preserve the cutting edge, the wheel is preferably made out of a hard steel or carbide material.

To assist in the cutting action produced by the wheel, an ultrasonic transducer 82 may be connected to the side of the drive rod 50 to generate high frequency, low amplitude vibrations between the cutting edge of the wheel and the hard support surface 14. Such vibrations supplement the downward force produced by the cylinder assembly 42 and aid in severing the material that is cut by the wheel 12.

Figure 4:
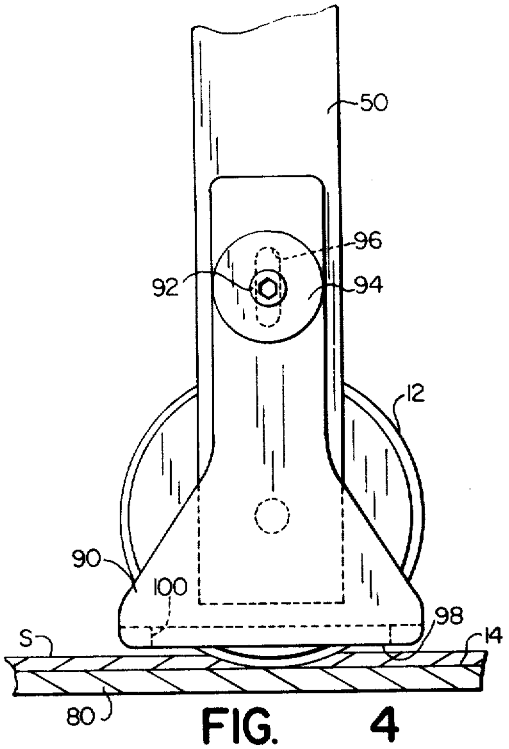
FIG. 4 is an enlarged side elevation view of the cutting wheel and stripper.

As shown most clearly in FIGS. 4 and 5, a stripper 90 is connected to the lower end of the drive rod 50 and surrounds the cutting wheel 12 to insure that sheet material being cut by the wheel does not become attached to the cutting edge and lift away from the support surface 14. The stripper 90 has a U-shape and is connected to opposite sides of the square drive rod 50 by means of cap screws 92 and washers 94. The cap screws pass through vertically oriented slots 96 in the sides of the stripper so that the height of the stripper above the support surface 14 can be adjusted to accommodate sheet material in various plies and thicknesses.

The lower end of the stripper has an expansive base with a lower surface 98 situated in confronting relationship with the sheet material on the support surface 14. A slot 100 in the center of the base accommodates the cutting wheel 12 and has a width slightly greater than the thickness of the wheel to allow free rotation without excessive clearance. Therefore, the foot prevents any significant lifting of the sheet material which could shift the positioning of the material on the support surface, and also prevents any possibility of the material becoming caught within the bifurcation of the drive rod 50 in which the wheel is mounted.

Figure 6:
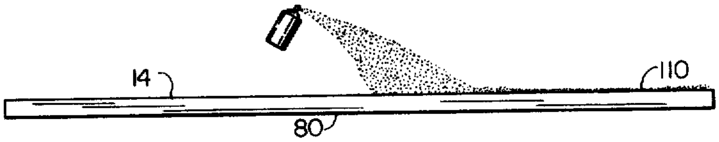
FIGS. 6–8 schematically illustrate one means and method for attaching sheet material to a hard support surface for cutting with the cutting wheel.

It will be understood that in order to insure accurate cutting of sheet material in accordance with the program established in tape 20 of FIG. 1, it is essential that the sheet material remain in a fixed position on the support surface 14 throughout the cutting operation. In accordance with the present invention, attaching means are provided to secure the material directly to the support surface 14. In one embodiment of the invention illustrated in FIGS. 6–8, a releasable, pressure sensitive adhesive or other adherent material is provided between the sheet material and the confronting support surface of the plate 80. The adhesive can be applied by brushes, rollers or other means to either the surface 14 or the sheet material S, but preferably, as shown in FIG. 6, the adhesive is sprayed on the surface to more accurately control the thickness and distribution of the adhesive on the surface. It has been found desirable to distribute the adhesive over less than the entire area of the interface of the surface and the material by spraying the adhesive in a stipple pattern. Such a pattern allows the material to be laid on the surface and then be spread smoothly, but provides sufficient retaining force to prevent the material from shifting on the surface during cutting. A suitable commercial adhesive for this purpose is sold by Minnesota Mining and Manufacturing Company known as Pressure Sensitive Adhesive 75. Such adhesive provides the desired securing forces and allows fabric materials such as used in making garments to be separated from the support surface 14 after cutting without damage to the material and without leaving any residue on the material. Additionally, a single application of the adhesive to the support surface may be used a number of times without loss of its retentivity, and may be easily removed from the surface by means of acetone or commercial solvents.

Figure 7:
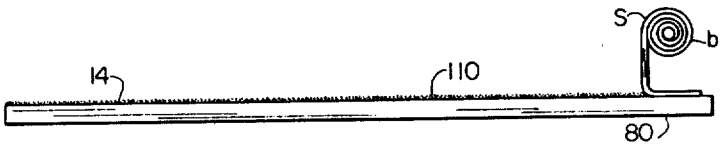
Figure 8:
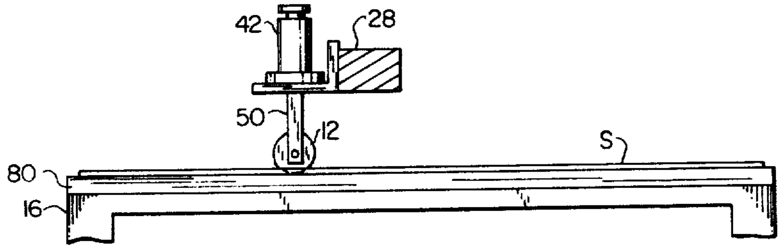

As shown in FIGS. 6 and 7, the plate 80 which defines the cutting surface 14 is removable and may be prepared with the adhesive 110 and a layer of limp sheet material S from a bolt b at a location remote from the cutting table itself. The spreading of the sheet material as shown in FIG. 7 may be accomplished with a conventional cloth spreader after which the material is smoothed by hand to remove any wrinkles. Then the plate with the sheet material is positioned on the table for cutting as illustrated in FIG. 8. After the material is cut, the plate 80 is taken from the table to another location for removal of the cut pieces and the waste material which renders the machine clear to receive another plate with the material already spread. In this manner the cutting machine operation is not delayed by either the spreading or the piece removal steps.

Figure 9:
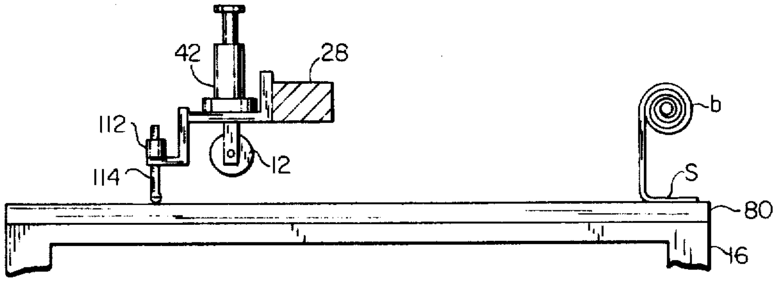
FIGS. 9–11 illustrate another means and method for attaching sheet material to a hard support surface and means for removing the material after cutting.
Figure 10:
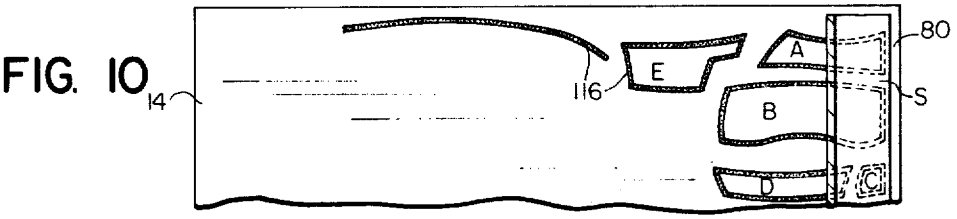
Figure 11:
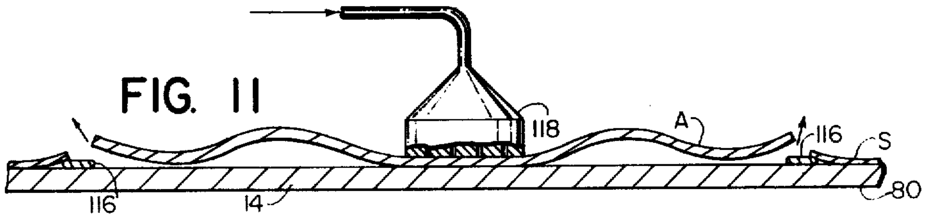

Another embodiment of the invention in which an adhesive is applied to less than the entire area of the support surface of the plate 80 is illustrated in FIGS. 9–11. In this embodiment an adhesive dispenser 112 is connected to the Y-carriage 28 and carries a glue stick or shaft 114 which produces a line of adhesive on the surface of the plate 80 as the carriages 26 and 28 translate back and forth over the table 16. The shaft 114 may be comprised by an adhesive in solid form which is rubbed onto the surface of the plate 80, or the shaft may be hollow and serve as a conduit through which an adhesive stored within the dispenser 112 is discharged onto the surface in a manner similar to the deposition of ink on a plotting paper.

In this embodiment of the invention, the controls for the carriages 26 and 28 are energized and operated in response to the same program tape which displaces the cutting wheel 12 in the course of a cutting operation except that the cutting wheel is held in a retracted position as shown. An offset is automatically introduced into the X and Y control channels to account for the physical offset of the cutting wheel and the adhesive shaft 114. With the controls operating in this manner, adhesive from the shaft 114 is deposited along limited areas of the support plate 80 corresponding to the outlines or lines of cut for the pattern pieces produced from the sheet material by the same cutting program. A plurality of adhesive traces 116 produced by the dispenser 112 are illustrated in FIG. 10 and outline pattern pieces A, B, C etc.

After the adhesive traces are produced for the entire marker that is to be cut on the plate 80, sheet material S from the bolt b is spread on top of the support surface 14 and is secured to the surface by means of the adhesive traces at the interface of the material and surface. A cutting process with the cutting wheel 12 is then executed as described above and illustrated in FIG. 8. The wheel penetrates through the sheet material along the lines of cut overlying the adhesive traces to sever the pattern pieces from the remaining material. Since the adhesive trace is wider than the cut produced by the wheel, both the pattern pieces themselves and the surrounding material remain attached to the support plate 80 and there is no danger of the pieces or the materials shifting while the cutting operation is carried out.

After the cutting operation has been completed and all of the pattern pieces in the marker have been cut, the pattern pieces and the remaining material are separately pulled from the support surface 14.

Another method which may be employed to remove the pattern pieces in this embodiment of the invention is illustrated in FIG. 11. If the sheet material is air permeable, an air nozzle 118 is positioned within the periphery of a cut pattern piece, for example pattern piece A in FIG. 10, and air is forced downwardly through the pattern piece and increases the pressure between the pattern piece and the support surface 14. When the pressure exceeds the strength of the adhesive in the closed trace 116 at the periphery of the pattern piece, the sheet material pulls free of the adhesive and the plate 80. Once set free, the pattern pieces are then dumped or otherwise picked up from the plate 80 and the remaining sheet material S, still attached to the traces 116, is removed separately thereafter.

Figure 12:
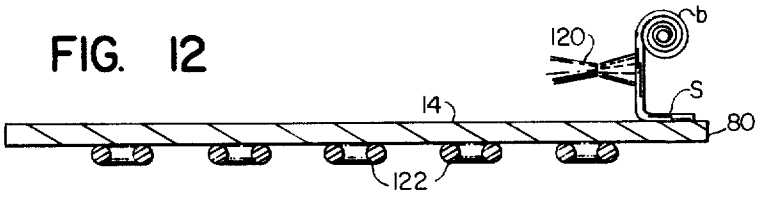
FIGS. 12 and 13 illustrate still a further method for attaching and removing sheet material.
Figure 13:
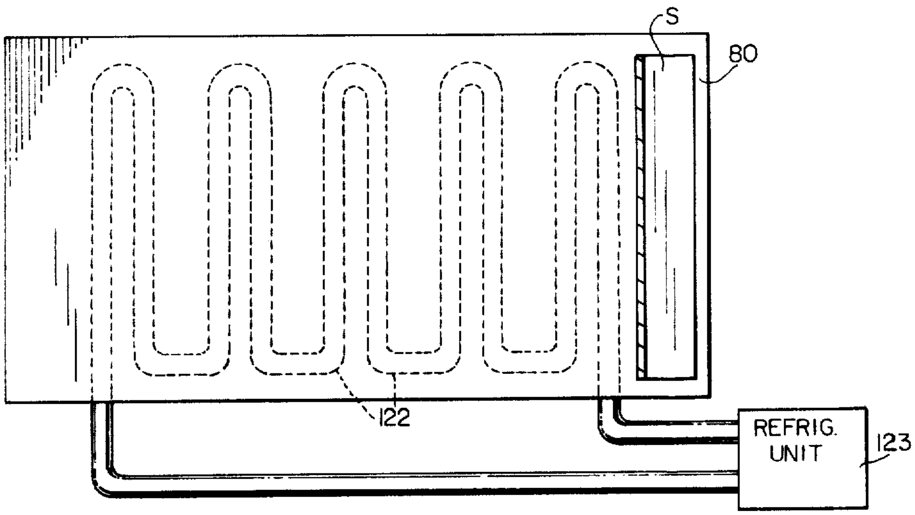

FIGS. 12 and 13 illustrate another embodiment of the invention in which the sheet material S from a bolt b of material is applied to the surface 14 of a support plate 80 by means of a settable fluid such as water which assumes a solid state when frozen. For example, water may be lightly sprayed from a nozzle 120 in FIG. 12 against the sheet material S to dampen the material as the material is spread on the upper surface 14 of the support plate 80 formed from metal or other material having a high coefficient thermal conductivity. The plate 80 is positioned in adjacent relationship with the evaporator coils 122 of a refrigeration unit 123. The plate 80 may be cooled below the freezing temperature of water prior to the spreading of the sheet material on the surface 14 so that the sprayed water freezes and joins the sheet material to the plate 80 as the material is progressively spread across the surface 14. Of course, the plate 80 may be positioned in a freezer compartment remote from the location where spreading takes place, then removed from the compartment and translated to the spreading location for attachment of the sheet material. The latent heat, or absence thereof, may be relied upon to provide the needed cold to freeze the material to the plate without evaporator coils below the plate.

Once attached, the material and plate are then positioned on the cutting table 16 in FIG. 1, and cutting takes place as described above.

After the cutting operation, the frozen water which attaches the sheet material to the plate 80 is melted by applying heat to thc lower surface of the plate 80 or by warming the entire structure, and as the water melts, the material is released from the surface 14. Since a very light layer of water is required to attach the sheet material to the plate, the heat applied during the releasing steps may also completely evaporate the water and leave the cut sheet material totally dry.

FIGS. 14 and 15 illustrate still a further embodiment of the invention in which the sheet material S is electrostaticly secured to the support plate 80. In this embodiment, a pair of branched conductors 124 and 126 are positioned on the lower surface of the plate 80 or are embedded within the plate with the branches of the two conductors located alternately in parallel relationship from one end of the plate to the other as shown in FIG. 15. The conductors connect respectively with the outputs of a DC voltage generator 128, and when the voltage generator is energized, electric fields between the alternate conductors create an electrostatic holddown force to secure the sheet material S to the plate 80. The material from which the plate 80 is constructed is preferably a dielectric material such as that marketed under the tradename Micarda with an upper surface 14 that is relatively hard for cutting.

In a cutting operation, the plate 80 is located in the cutting machine and attached to the voltage generator 128 to maintain the electrostatic field and hold the material on the plate. When cutting is complete, the generator is de-energized and the cut pattern pieces and remaining sheet material are removed from the plate.

FIG. 16 illustrates still a further embodiment of the invention in which the downward force of the cutting wheel 12 is produced and controlled by means of an electromagnet 130. The platform 40 is connected to the projecting end of the Y-carriage 28 for vertical movement relative to the surface 14 by means of a slide with bearings 132 shown schematically. The platform 40 is resiliently suspended by means of a tension spring 134 extending between the platform and the scaffold 136; however, a compression spring under the platform would serve the same function.

The electromagnet 130 rests upon a flange 138 on the drive rod 50 and has a U-shaped configuration which preferably remains aligned with the plane of the cutting wheel 12 to prevent tilting moments from being applied to the wheel. The conductors 140 which energize the electromagnet may be coupled through slip rings between a control amplifier 142 on the Y-carriage 28 or may extend directly between the amplifier and the magnet provided that the rotation of the cutting wheel about the $\theta$-axis is restricted to $\pm 180°$.

While the electromagnet 130 is de-energized, the spring 134 holds the platform 40 together with the cutting wheel 12 upwardly away from the support surface 14 of the plate 80 and out of cutting engagement with the sheet material S. When energized, however, the electromagnet cooperates with a ferromagnetic material in the material in the plate 80 or elsewhere below the support surface 14, and pulls the platform and the cutting wheel downwardly and places the cutting edge of the wheel in engagement with the support surface 14 to cut the sheet material as the wheel is translated over the plate. The magnitude of the force with which the wheel is pressed against the plate can be regulated through the control amplifier 142.

The advantage of employing the electromagnet 130 is that the holddown forces applied between the cutting wheel 12 and the plate 80 are not reacted through the carriages 26 or 28 or the bearings between those carriages and the table 16. Accordingly, the carriage structures, including the beam of the X-carriage 26 which spans the cutting table as shown in FIG. 1, may have a much lighter construction, and correspondingly higher rates of acceleration and deceleration are achieved to execute cutting operations in shorter periods of time.

It will be understood that either the plate 80 or the underlying structure within the cutting table 16 (FIG. 1) must be constructed of a ferromagnetic material that cooperates with the electromagnet in developing the forces on the wheel 12. For example, the plate 80 may be a metal plate of mild steel which is held to the table by vacuum or mechanical connections. Since the load path between the wheel and the plate or table is restricted to a localized area around the wheel and the periphery of the magnet, the holding mechanism for the plate is not severely strained. Also, the structure underlying the plate 80 may be of a ferromagnetic material, in which case materials forming the plate need not be ferromagnetic at all.

A further aspect of the present invention is illustrated in connection with FIGS. 17 and 18. In prior art cutting systems which utilize an elongated cutting blade having a leading cutting edge that is advanced along a cutting path, it is customary to cut angles in a predefined cutting path by advancing the blade along one side of the angle toward and then past the apex, then lifting the cutting blade out of engagement with the material and rotating the blade into alignment with the other side of the angle before plunging the blade back into the material at the apex and advancing along the other side. This procedure of cutting beyond the apex or overcutting the apex is followed to insure that the material at the apex is completely cut and no threads or remanent material remains between the pattern piece and surrounding material when the pattern piece including the angle is removed from the table. Also, in the same cutting situation, it is known to incrementally advance the blade along the second side of the angle prior to plunging the blade through the material at the apex to prevent the trailing edge or heel of the blade from inadvertently cutting through a closely spaced adjacent pattern piece.

An example of an angle cut is shown in FIG. 17. Pattern piece A has a corner angle defined by side 150 and side 152. If the angle were cut by translating an elongated cutting blade first along side 150 and then along side 152 in the directions of the arrows, it would sometimes be necessary due to the sharpness of the angle to lift the cutting blade out of engagement with the material and rotate it into alignment with side 152 at the apex. A slight overcut along side 150 and a heel cut along side 152 would insure complete severence of the pattern piece A from the surrounding material. Thus, translation of the cutting blade along side 150 would move the blade slightly beyond the apex of the angle before the cutting blade is lifted out of the material. The blade would then be rotated and advanced a slight amount before plunging back into the material to prevent the heel of the cutting blade from severing the adjacent pattern piece B.

With the cutting wheel 12, the overcut at the apex of the angle and advancing motion before plunging is unnecessary. As shown in FIG. 18, the segment of the wheel buried within the thin layer of sheet material S is theoretically tangent to the support surface 14 at the intersection of the $\theta$-axis and the surface. However, in reality, when a downward force is applied to the wheel, a finite length of the cutting edge is in contact with and actually scores the surface 14 so that overcutting at the apex of an angle is not necessary. Instead, the $\theta$-axis of the wheel need only be advanced to the apex as illustrated in FIG. 17 before the forward motion of the wheel along the side 150 is stopped and the wheel is lifted out of cutting engagement with the material. Furthermore, after the wheel has been rotated directly above the apex into alignment with the second side 152 of the angle, the wheel may simply be plunged downwardly through the material without incremental advancement to avoid an excessively deep heel cut. Thus, with a cutting wheel 12, movement of the wheel, and correspondingly the $\theta$-axis, around the apex of an angle can precisely track the contours of the pattern piece without overcutting and incrementally advancing before plunging, and the angular cuts completely sever the pattern pieces from the surrounding material.

While the present invention has been described in several embodiments, it should be understood that numerous other modifications and substitutions can be made without departing from the spirit of the invention. For example, a variety of materials may be used as the adhesive or settable fluid which attaches the sheet material to the support surface of the cutting table. The surface of the table may be defined by a removable or permanent plate constructed from a magnetic or non-magnetic material. The adhesive may be applied either to the surface of the plate or to the material, or the material itself may have an adhesive component that can serve as the releasable adhesive for holding the sheet material on the support surface. Although the cutting methods disclosed may be carried out with more than one ply of sheet material, the disclosed methods have particular utility for single ply cutting. Pressure between the cutting wheel and the support surface can be generated by a number of means and may be superimposed with a high frequency, low amplitude vibratory force from an ultrasonic or other transducer. Accordingly, the present invention has been described in several embodiments by way of illustration rather than limitation.

We claim:

1. A method of cutting limp sheet material along predetermined lines of cut defining the contours of pattern pieces comprising the steps of:
   - providing in a program controlled cutting machine a support having a hard, smooth surface on which limp sheet material is positioned for cutting;
   - attaching limp sheet material to be cut to the hard, smooth surface of the support in a flat condition for cutting by spreading an adhesive directly on the support surface by spraying the adhesive in a stipple pattern on the support surface such that less than the entire area of the surface is provided with adhesive and laying the limp sheet material in contact with the adhesive on the surface so that only adhesive lies between the material and the hard surface;
   - placing a cutting wheel having a sharp peripheral cutting edge in engagement with the attached sheet material;
   - moving the cutting wheel and the attached sheet material relative to one another to advance the wheel along a closed and predetermined line of cut defining the contours of a pattern piece in accordance with a cutting program and simultaneously pressing the cutting wheel against the hard support surface with sufficient pressure to cause the cutting edge of the wheel to cut through the attached material to the support surface along the line of cut and sever a pattern piece from the surrounding material and then;
   - removing the cut pattern piece from the support surface and the surrounding material adhesively attached to the surface.

2. A method of cutting sheet material as defined in claim 1 wherein:
   - the step of attaching by spreading an adhesive directly on the support surface comprises attaching one piece of sheet material to the surface of the support by spraying a releasable adhesive on the surface; and additional steps include
   - removing the surrounding material from the releasable adhesive on the support surface, attaching another piece of sheet material to the support surface with the same releasable adhesive on the surface and repeating the steps of placing, moving and pressing the cutting wheel to cut another pattern piece along the closed and predetermined line of cut with the same adhesive.

3. A method of cutting sheet material as defined in claim 2 wherein the step of removing the cut pattern piece comprises generating fluid pressure between the surface of the support and the attached pattern piece to release the piece from the adhesive.

4. A method of cutting sheet material as defined in claim 1 wherein:
   - the step of providing a support and attaching comprise providing a metal plate having a hard, smooth surface and attaching the sheet material to the surface, and additional steps include
   - positioning the plate with the attached sheet material in a cutting machine under the cutting wheel for cutting of the material and removing the plate with the cut sheet material from the machine after cutting.

5. The method of cutting limp sheet material in patterns along closed, predetermined lines of cut comprising the steps of:
   - providing a support having a hard, continuous and smooth support surface on which the limp sheet material is positioned for cutting;
   - attaching the limp sheet material to be cut to the hard, smooth support surface by applying an adhesive with a program controlled adhesive dispenser to the support surface in a closed path corresponding to a programmed line of cut around a pattern, and then laying the sheet material on the support surface with the adhesive securing the material to the surface;
   - placing a program controlled cutting wheel having a sharp peripheral cutting edge in engagement with the attached sheet material; and then
   - moving the program controlled cutting wheel and the attached sheet material relative to one another to advance the wheel along the programmed line of cut and simultaneously pressing the cutting wheel against the support surface with sufficient pressure to cause the cutting edge of the wheel to cut through the material to the hard, smooth support surface along the line of cut.

6. A method of cutting sheet material as in claim 5 wherein an additional step includes producing a region of increased pressure between the support surface and the sheet material within the closed path of adhesive after cutting to separate the attached pattern piece from the adhesive.

* * * * *